(12) United States Patent
Rheaume et al.

(10) Patent No.: US 11,721,857 B2
(45) Date of Patent: Aug. 8, 2023

(54) THERMAL REGULATION OF BATTERIES

(71) Applicant: Hamilton Sundstrand Corporation, Charlotte, NC (US)

(72) Inventors: Jonathan Rheaume, West Hartford, CT (US); Malcolm Macdonald, West Hartford, CT (US); Charles E. Lents, Amston, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/824,602

(22) Filed: Mar. 19, 2020

(65) Prior Publication Data

US 2020/0303792 A1  Sep. 24, 2020

Related U.S. Application Data

(60) Provisional application No. 62/821,297, filed on Mar. 20, 2019.

(51) Int. Cl.
*H01M 10/00* (2006.01)
*H01M 10/6567* (2014.01)
(Continued)

(52) U.S. Cl.
CPC ..... *H01M 10/6567* (2015.04); *H01M 10/443* (2013.01); *H01M 10/486* (2013.01); *H01M 10/635* (2015.04); *H01M 10/6561* (2015.04)

(58) Field of Classification Search
CPC ......... H01M 10/6567; H01M 10/6568; H01M 10/635; H01M 10/6561; H01M 10/656;
(Continued)

(56) References Cited

U.S. PATENT DOCUMENTS 4,468,440 A   8/1984  Evjen
8,047,318 B2  11/2011 Zhu et al.
(Continued)

FOREIGN PATENT DOCUMENTS

CN   206961980 U   2/2018
EP   2273088 A1    1/2011
(Continued)

OTHER PUBLICATIONS

Partial European Search Report dated Oct. 15, 2020, issued during the prosecution of European Patent Application No. EP 20181246.8.
(Continued)

*Primary Examiner* — Raymond Alejandro
(74) *Attorney, Agent, or Firm* — Locke Lord LLP; Scott D. Wofsy; Alicia J. Carroll

(57) ABSTRACT

A battery thermal management system for an air vehicle includes a liquid heat exchange circuit. The system includes at least one battery in thermal communication with the liquid heat exchange circuit. The system includes a controller operatively connected to the liquid heat exchange circuit. The controller is configured and adapted to variably select whether heat will be rejected to the liquid heat exchange circuit. The system includes at least one heat exchanger positioned on the liquid heat exchange circuit. The at least one heat exchanger is a liquid-air heat exchanger or a liquid-liquid heat exchanger. A method for controlling a thermal management system for an air vehicle includes determining an expected temperature of at least one battery, and cooling the at least one battery with a cooling device if the expected temperature exceeds a pre-determined expected temperature threshold.

10 Claims, 3 Drawing Sheets

(51) Int. Cl.
*H01M 10/635* (2014.01)
*H01M 10/44* (2006.01)
*H01M 10/6561* (2014.01)
*H01M 10/48* (2006.01)

(58) Field of Classification Search
CPC ... H01M 10/63; H01M 10/443; H01M 10/486
See application file for complete search history.

(56) References Cited

U.S. PATENT DOCUMENTS

| | | | |
|---|---|---|---|
| 9,016,080 B2 | 4/2015 | Brodie et al. | |
| 9,583,801 B2 | 2/2017 | Steinmeyer et al. | |
| 9,623,719 B2 | 4/2017 | Hatakeyama et al. | |
| 9,701,215 B1 | 7/2017 | Kim | |
| 10,096,869 B2 | 10/2018 | Zheng et al. | |
| 10,128,544 B2 | 11/2018 | Cutright et al. | |
| 10,150,570 B2 | 12/2018 | Joubert et al. | |
| 2012/0085512 A1 | 4/2012 | Graaf et al. | |
| 2016/0144731 A1 | 5/2016 | Park | |
| 2017/0005375 A1* | 1/2017 | Walker | H01M 10/6567 |
| 2018/0304765 A1 | 10/2018 | Newman et al. | |
| 2019/0020078 A1 | 1/2019 | Brinkmann et al. | |

FOREIGN PATENT DOCUMENTS

| | | | | |
|---|---|---|---|---|
| EP | 2903076 A1 | | 8/2015 | |
| JP | 2015-85699 | * | 5/2015 | ............... B60K 6/20 |
| JP | 2015085699 A | | 5/2015 | |
| KR | 20120133872 A | | 12/2012 | |

OTHER PUBLICATIONS

Extended European Search Report dated Sep. 8, 2020, issued during the prosecution of European Patent Application No. EP 20163920.0.
Communication Pursuant to Art 94(3) EPC dated Feb. 7, 2023, issued during the prosecution of European Patent Application No. EP 20163920.0, 5 pages.

* cited by examiner

THERMAL REGULATION OF BATTERIES

CROSS-REFERENCE TO RELATED APPLICATION

This application claims priority to U.S. Provisional Patent Application Ser. No. 62/821,297, filed Mar. 20, 2019, the contents of which are herein incorporated by reference in their entirety.

STATEMENT REGARDING FEDERALLY SPONSORED RESEARCH OR DEVELOPMENT

This invention was made with government support under contract number NNC14CA32C awarded by the National Aeronautics and Space Administration. The government has certain rights in the invention.

BACKGROUND OF THE INVENTION

1. Field of the Invention

The present disclosure relates to thermal management and more particularly to thermal management for aircraft batteries.

2. Description of Related Art

Aircraft batteries need thermal management to avoid damage due to overheating and overcooling. Future aircraft may use batteries to feed motors for electric or hybrid-electric propulsion, airfoil stall margin management, and other applications. Thermal management of battery banks is required in order to avoid overheating batteries resulting in premature aging that reduces their storage capacity with repeated cycles ("capacity fade"). In addition, some battery chemistries may suffer from thermal runaway at elevated temperature leading to damage of the batteries and potentially of surrounding equipment.

The conventional techniques have been considered satisfactory for their intended purpose. However, there is an ever present need for improved thermal management for batteries. This disclosure provides a solution for this need.

SUMMARY OF THE INVENTION

A battery thermal management system for an air vehicle includes a liquid heat exchange circuit. The system includes at least one battery in thermal communication with the liquid heat exchange circuit. The system includes a controller operatively connected to the liquid heat exchange circuit. The controller is configured and adapted to variably select whether heat will be rejected to the liquid heat exchange circuit. The system includes at least one heat exchanger positioned on the liquid heat exchange circuit. The at least one heat exchanger is a liquid-air heat exchanger or a liquid-liquid heat exchanger.

In certain embodiments, the liquid-liquid heat exchanger is configured and adapted to be operatively connected to a movable second liquid heat exchange circuit. The liquid-air heat exchanger can be positioned on an air heat exchange circuit in fluid communication with an air scoop. The system can include a temperature sensor upstream from the liquid-air heat exchanger positioned to measure a total air temperature of air entering the air scoop. The system can include a pump operatively connected to the liquid heat exchange circuit. The system can include a controller operatively connected to the ram air door. The controller can be operatively connected to the pump. If an expected battery temperature exceeds a pre-determined threshold, the controller is configured and adapted to command the pump ON to circulate heat transfer fluid through the liquid heat exchange circuit and pre-cool the at least one battery prior to the at least one battery being charged or discharged. The temperature sensor can be positioned upstream from the air heat exchange circuit to measure a total air temperature of air entering the air scoop. The controller can be operatively connected to the temperature sensor to receive temperature data therefrom.

In some embodiments, the controller can be configured and adapted to at least one of activate or deactivate a coolant pump depending on the temperature data from the temperature sensor. The controller can be configured and adapted to close a flow restrictor if the total air temperature of air entering the air scoop is greater than a desired battery temperature. The controller can be operatively connected to the liquid heat exchange circuit. If the expected battery temperature exceeds a pre-determined threshold, the controller can be configured and adapted to command the liquid heat exchange circuit "ON" to pre-cool the at least one battery prior to the at least one battery being charged or discharged. The system can include a battery temperature sensor positioned to measure a temperature of the at least one battery.

In accordance with another aspect, a method for controlling a thermal management system for an air vehicle includes determining an expected temperature of at least one battery, and cooling the at least one battery with a cooling device if the expected temperature exceeds a pre-determined expected temperature threshold.

In certain embodiments, determining the expected temperature includes measuring a temperature of the at least one battery. The cooling device can be a liquid-air heat exchanger positioned on a liquid heat exchange circuit and an air heat exchange circuit to exchange heat therebetween. The air heat exchange circuit can be in fluid communication with an air scoop. The method can include measuring a total air temperature of air entering the air scoop with a temperature sensor upstream from the air heat exchange circuit. Cooling the at least one battery includes measuring a total air temperature of air entering an air scoop. If the total air temperature of air entering the air scoop is below a pre-determined total air temperature threshold, cooling the at least one battery can include opening a flow restrictor to cool the at least one battery. The cooling device can be a liquid-liquid exchanger positioned on a first liquid heat exchange circuit and a movable second liquid heat exchange circuit to exchange heat therebetween. The method can include charging and/or discharging the at least one battery if the expected temperature of the at least one battery does not exceed the pre-determined expected temperature threshold.

In accordance with another aspect, a method for controlling a thermal management system for an air vehicle includes determining an expected temperature of at least one battery, and charging and/or discharging the at least one battery if the expected temperature of the at least one battery does not exceed a pre-determined temperature threshold. Charging and/or discharging can include selectively allowing the at least one battery to heat up depending on whether a heat sink is available.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
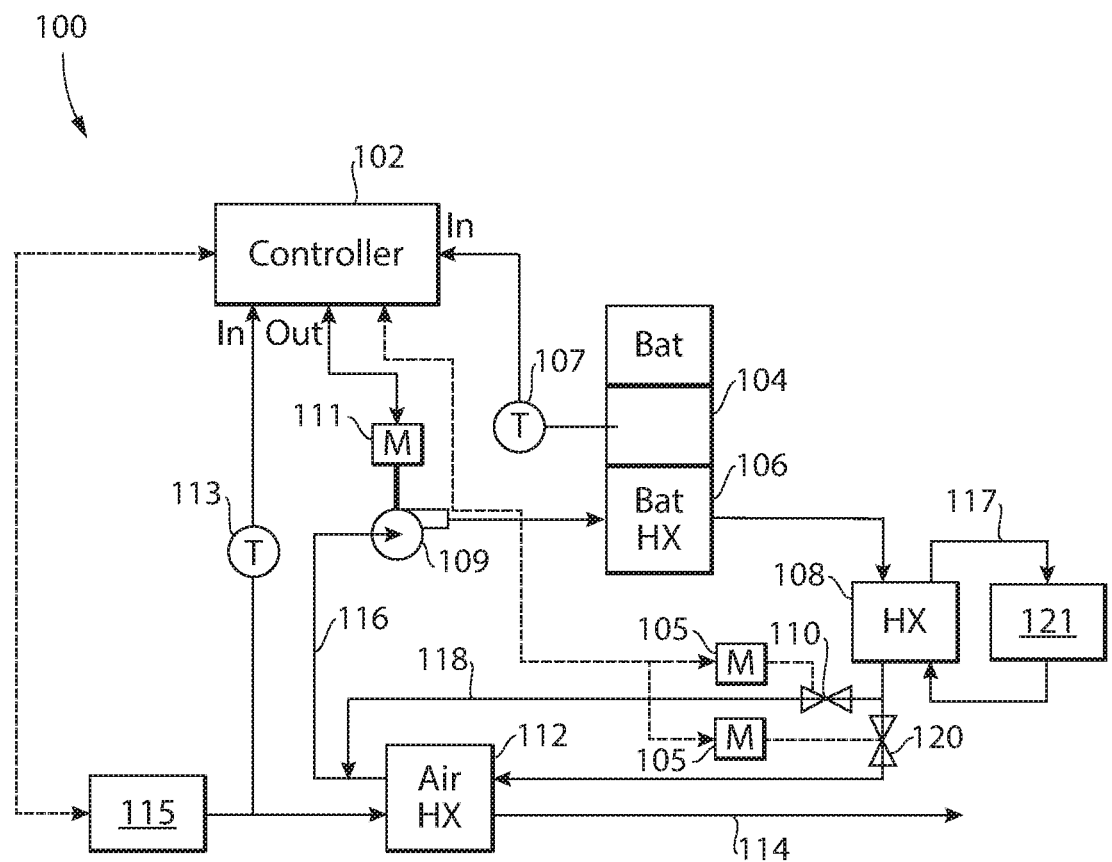
FIG. 1 is a schematic representation of an exemplary embodiment of a battery thermal management system constructed in accordance with the present disclosure, showing the battery operatively connected to a battery heat exchanger.

Reference will now be made to the drawings wherein like reference numerals identify similar structural features or aspects of the subject disclosure. For purposes of explanation and illustration, and not limitation, a schematic view of an exemplary embodiment of the battery thermal management system in accordance with the disclosure is shown in FIG. 1 and is designated generally by reference character 100. Other embodiments of the battery thermal management system in accordance with the disclosure, or aspects thereof, are provided in FIG. 2 as will be described. The systems and methods described herein can be used to pre-cool idle batteries and cool batteries during charge/discharge in order to avoid overheating and capacity fade for batteries in hybrid-electric propulsion, all-electric propulsion, airfoil stall margin management, and other applications.

As shown in FIG. 1, a battery thermal management system 100 for an air vehicle includes a controller 102, a liquid heat exchange circuit 116, an air heat exchange circuit 114, a liquid-air heat exchanger 112 and a liquid-liquid heat exchanger 108. Signals to and from the controller 102, indicated schematically by solid and/or dashed lines extending therefrom, can be routed to and from dedicated ports on the controller 102, or the sensors and actuators (described below) can be networked together with each device having its own address. In some embodiments, the components may communicate with the controller via a standard communication protocol involving the transfer of digital information. Those skilled in the art will readily appreciate that while certain inputs/outputs are shown controller could include a variety of other inputs/outputs. A liquid heat transfer fluid, coolant, circulates through said liquid heat exchange circuit 116, to transfer heat between batteries 104 and the coolant. The system 100 includes a battery heat exchanger 106 positioned on the liquid heat exchange circuit 116 in thermal communication with a bank of batteries 104. The liquid-air heat exchanger 112 is positioned on the air heat exchange circuit 114 in fluid communication with an air scoop (not shown) by way of a ram air door 115. Ram air is air outside of the fuselage of an aircraft. While the heat sink for air heat exchange circuit 114 is described herein as ram air, those skilled in the art will readily appreciate that heat exchange circuit 114 can be operatively connected to other ducts to receive fan duct bypass air, cabin outflow air, conditioned air from an environmental control system, or the like. The bank of batteries 104 are in thermal communication with the liquid heat exchange circuit 116 by way of the battery heat exchanger 106. For example, these can be reserve batteries that are inoperative during cruise, or batteries of a hybrid electric aircraft propulsion system where the batteries and electric motors assist with takeoff and climb, but are inoperative during cruise. The batteries 104 could be positioned in a variety of positions throughout the aircraft, for example, in the wings (e.g. in wing roots). In some embodiments, batteries 104 can furnish energy to a propulsion system for propulsion power or for transient operation (e.g. to avoid stall) or for other applications. The system 100 assists in avoiding battery overheating and damage during charging and discharging due to internal resistances.

With continued reference to FIG. 1, a coolant pump 109 is upstream from the battery heat exchanger 106. Pump 109 is fluidically connected to the liquid heat exchange circuit 114 to circulate heat transfer fluid to heat or cool the batteries 104 downstream. The heat transfer fluid can be any of a number of fluids, including but not limited to water and other aqueous fluids, as well as polar and non-polar organic fluids. In some embodiments, the heat transfer fluid can be in liquid form, but can also be in gaseous form as well as including gas or liquid form such as in a vapor compression heat transfer loop. Examples of heat transfer fluids include but are not limited to glycols such as ethylene glycol or propylene glycol, alcohols such as methanol or ethanol, water and aqueous solutions such as heat transfer brines, and other organic fluids such as propane, butane, and substituted hydrocarbons (e.g., fluoro-substituted) and other organic compounds such as 2,2,3,3-tetrafluoropropene or 1,1,1,2-tetrafluoroethane. Flight-critical components of a propulsion system 100, such as a coolant circulation pump 109, may be present in duplicate on an aircraft for redundancy. Moreover, it is contemplated that more than two pumps 109 can be used in system 100. Those skilled in the art will readily appreciate that pump 109 can be a centrifugal pump, reciprocating pump, screw pump, diaphragm pump, or any other suitable mechanical pump. A respective motor 111 is operatively connected to the coolant pump 109 to drive the coolant pump 109. In general, the batteries 104 reject heat to the air heat exchange circuit 114 by way of the liquid heat exchange circuit 116. In some embodiments, the liquid-air heat exchanger 112 can be sized to reject waste heat generated by the batteries 104 in full at a particular altitude, which is associated with temperature and pressure of the air heat sink (ram air). Below that altitude, only part of the heat generated by the batteries may be rejected. Above that altitude, not only the heat load from battery operation, but also the stored thermal energy can be rejected. Thermal energy storage allows excess thermal energy to be stored and used hours, days, or months later. Operation of system 100 is controlled by controller 102 at various altitudes, as described in more detail below.

As shown in FIG. 1, controller 102 is in operative communication with the pump 109 and motor 111. A temperature sensor 107 is operatively connected to the batteries 104 and controller 102. Those skilled in the art will readily appreciate that, due to the complexities involved in obtaining a battery temperature, the temperature sensor 107 may be operatively connected to the heat transfer fluid exiting the battery heat exchanger 106 in liquid heat exchange circuit 116 as a proxy for battery temperature. Controller 102 is configured to receive information about battery temperature from temperature sensor 107 and relay a command, if needed, to one or more of motor 111, pump 109, or valves 110 and 120 (described below). In some embodiments, it is also contemplated that controller could send a command to temperature sensor 107. The system 100 includes a bypass valve 120 positioned in the liquid heat exchange circuit 116 upstream from the liquid-air heat exchanger 112. The system 100 includes a bypass line 118 branching from the liquid heat exchange circuit 116 upstream from the liquid-air heat exchanger 112 and reconnecting to the liquid heat exchange circuit 116 downstream from the liquid-air heat exchanger 112. The system 100 includes a bypass line valve 110 positioned on the bypass line 118.

With continued reference to FIG. 1, bypass line valve 110 and bypass valve 120 include respective motors 105 in operative communication with controller 102 to receive open/close commands therefrom. In some embodiments, valves 110 and 120 can be combined into a three-way valve that directs flow either to liquid-air-heat exchanger 112 or to bypass line 118. Bypass line 118 assists in diverting around the liquid-air heat exchanger 112 to avoid heating the fluid during conditions where the total air temperature of ram air is greater than the maximum battery temperature operating limit. If the total air temperature of the ram air is above a pre-determined total air temperature threshold, the controller 102 operates to command valve 110 open and 120 close (e.g. by way of their respective motors 105). Motors 105 receive a command from controller and, in turn, operate to open or close their respective valves 110 or 120. This bypass command can accompany the command that closes ram air door 115 or can be independent thereof. The reverse command can be executed once the total air temperature lowers below the pre-determined total air temperature threshold. Valves 120 and/or 110 can be a gate valve, a globe valve, a needle valve, or any other proportional valve.

With continued reference to FIG. 1, the liquid-air heat exchanger 112 is positioned on the liquid heat exchange circuit 116 and the air heat exchange circuit 114 to exchange heat therebetween. The air heat exchange circuit 114 includes a flow restrictor, e.g. a ram air door 115, to impede or allow flow of a heat sink fluid (e.g. ram air) to the liquid-air heat exchanger 112, described in more detail below. Ram air is air outside of the fuselage of an aircraft. Ram air door 115, when at least partially opened, provides during conditions where the batteries are idle and non-idle). The system 100 includes a temperature sensor 113 upstream from the liquid-air heat exchanger 112 positioned to measure a total air temperature of air entering the air scoop via ram air door 115. In some embodiments, the total air temperature may be reported to controller 102 from another source on the aircraft such as an air data computer which may be in operative communication with a thermometer that measure total air temperature. Air heat exchange circuit 114 can also include a fan or the like for conditions where the aircraft is idle, e.g. on ground. In the systems and embodiments of the present invention, the flow of air through ram air door 115 can be curtailed or eliminated during hot conditions, e.g. when the total air temperature is above a pre-determined total air temperature threshold, by closing the ram air door 115 either partially or fully. The controller 102 is operatively connected to the flow restrictor, e.g. ram air door 115, and to temperature sensor 113 to send/receive data therefrom. Generally, controller 102 is configured and adapted to open and/or close the ram air door 115 depending on the temperature data from the temperature sensor 113 and/or measured at the temperature sensor 107. In embodiments where several heat exchangers share a common ram air duct, the air heat exchange circuit 114 may be optionally outfitted with an air splitter (not shown) to branch the flow of ram air to individual heat exchangers. In this case, the flow restrictor can be a flow control valve such as a butterfly valve can be located upstream of liquid-air heat exchanger 112 to restrict or allow flow as needed. Those skilled in the art will readily appreciate that, in some embodiments, fluid in the heat exchange circuit 114 can vent outside of the aircraft after going through the liquid-air heat exchanger 112.

In some embodiments, if the total air temperature of the ram air is low enough, e.g. if the stagnation temperature of the ram air ($T_{ra}$) heat sink is less than the battery temperature ($T_B$) plus a delta T ($\Delta T$), the controller 102 keeps ram air door open and circuits 114 and 116 operational so that batteries may be cooled. In other words, when $T_{ra}<(T_B+\Delta T)$, then cooling the batteries 104 using the ram air can be initiated or continued. Delta T ($\Delta T$) is to ensure that there is enough of a temperature difference between $T_{ra}$ and $T_B$ ensure good heat transfer and to accommodate any heat generated from operation of pump 109. Delta T can be 5-10° C. (41-50° F.), for example. In some embodiments, aircraft may encounter a condition wherein heat rejection from batteries 104 continues during cruise in excess of battery heat loads. In other words, instead of just maintaining a battery temperature during periods of time when the batteries 104 are generating heat, such as charging or discharging, the batteries 104 can be cooled such that the temperature reduces while the batteries 104 are charging/discharging, or the batteries 104 can be cooled while the batteries 104 are idle (e.g. not charging/discharging). As a result, the batteries are cooled overall (for example to 5° C.). This is desirable because the charging process causes the batteries to heat up, and this gives an option to pre-cool them to reduce the cooling load later on. Since it is common for several heat exchangers to share a common ram air duct, the air heat exchange circuit 114 may be optionally outfitted with an air splitter (not shown) to branch the flow of ram air to individual heat exchangers. In this case, a flow control valve such as a butterfly valve can be located upstream of liquid-air heat exchanger 112 to restrict flow. Instead of commanding a ram air door 115 to close, as described throughout, controller 102 can command the flow control valve upstream from liquid-air heat exchanger 112 to open or close.

With continued reference to FIG. 1, the liquid-liquid heat exchanger 108 is positioned on a movable second liquid heat exchange circuit 117. Movable liquid heat exchange circuit 117 is operatively connected to a ground cart 121 that is used when the aircraft is landed and is permitted to be connected/disconnected from heat exchanger 108 at will depending on whether cooling on-ground is needed. The ground cart 121 can include a pump, motor and/or other hydraulic system components that can be used to drive liquid heat exchange circuit 117.

If an expected battery temperature exceeds a pre-determined threshold, and the total air temperature measured at sensor 113 is below a predetermined ram air threshold, it may be desired to pre-cool the batteries 104 with ram air to avoid overheating when thermal loads are imposed. Battery temperature is a function of several variables including battery mass, battery heat capacity, initial battery temperature, heat sink temperature, and thermal loads. The expected battery temperature can be predicted (calculated) from the heat loads, the specific heat of the battery (which can be characterized), the mass of the battery, and the initial battery temperature. Alternatively, the expected battery temperature can be predicted from empirical battery operating data to simplify the control of the thermal management system.

Those skilled in the art will readily appreciate that the expected temperature of a battery 104 (or group of batteries 104) can be calculated in real time or a look-up table can be used. Pre-cooling is a form of thermal storage in which heat has been removed and the lower temperature battery reflects the absence of heat. For example, on a hot day, aircraft batteries can be pre-cooled prior to takeoff in order to avoid high temperatures during discharging. If ram air is not available or is not cool enough, a cooling device such as a vapor cycle machine, ground cart cooling (as described above) or ice, etc. may be used for pre-cooling, or just cooling in general.

It is also contemplated that pre-cooling be done during flight for anticipated charging on the ground. In this embodiment, if $T_{ra}<(T_B+\Delta T)$, controller 102 is configured and adapted to command the ram air door 115 to open in order to pre-cool the batteries 104 prior to the batteries 104 being charged or discharged. For example, at a cruise altitude prior to landing, the ram air door 115 is opened to pre-cool the batteries 104 prior to landing where it is expected that the batteries 104 will need to be recharged. It is also contemplated that batteries may be recharged in flight and the available ram air through ram air door 115 can be used as a heat sink via air heat exchange circuit 114. This tends to allow the batteries 104 to take advantage of the excess power that engines typically have during cruise when they are no longer accelerating, thin air, and due to fuel weight loss. Batteries 104 can be charged during cruise to take advantage of the available power combined with the available heat sink, e.g. ram air.

As shown in FIG. 1, the controller 102 is configured and adapted to close the ram air door 115 if a total air temperature of air entering the air scoop is greater than a desired battery temperature or actual battery temperature (e.g. if $T_{ra}>(T_B+\Delta T)$). Those skilled in the art will readily appreciate that referring to "battery temperature," "battery heat load" or other singular reference to battery, could mean the temperature/heat load of an individual battery 104 or group of batteries 104. The controller 102 is operatively connected to the liquid heat exchange circuit 116 by way of its respective pump 109 and motor 111. If an expected heat load for batteries 104 exceeds a pre-determined threshold, and the total air temperature measured at sensor 113 is below a predetermined ram air threshold, controller 102 is configured and adapted to command the liquid heat exchange circuit "ON" and the ram air door 115 open to pre-cool the batteries 104 with air heat exchange circuit 114 and liquid heat exchange circuit 116 prior to the batteries 104 being charged or discharged.

Figure 2:
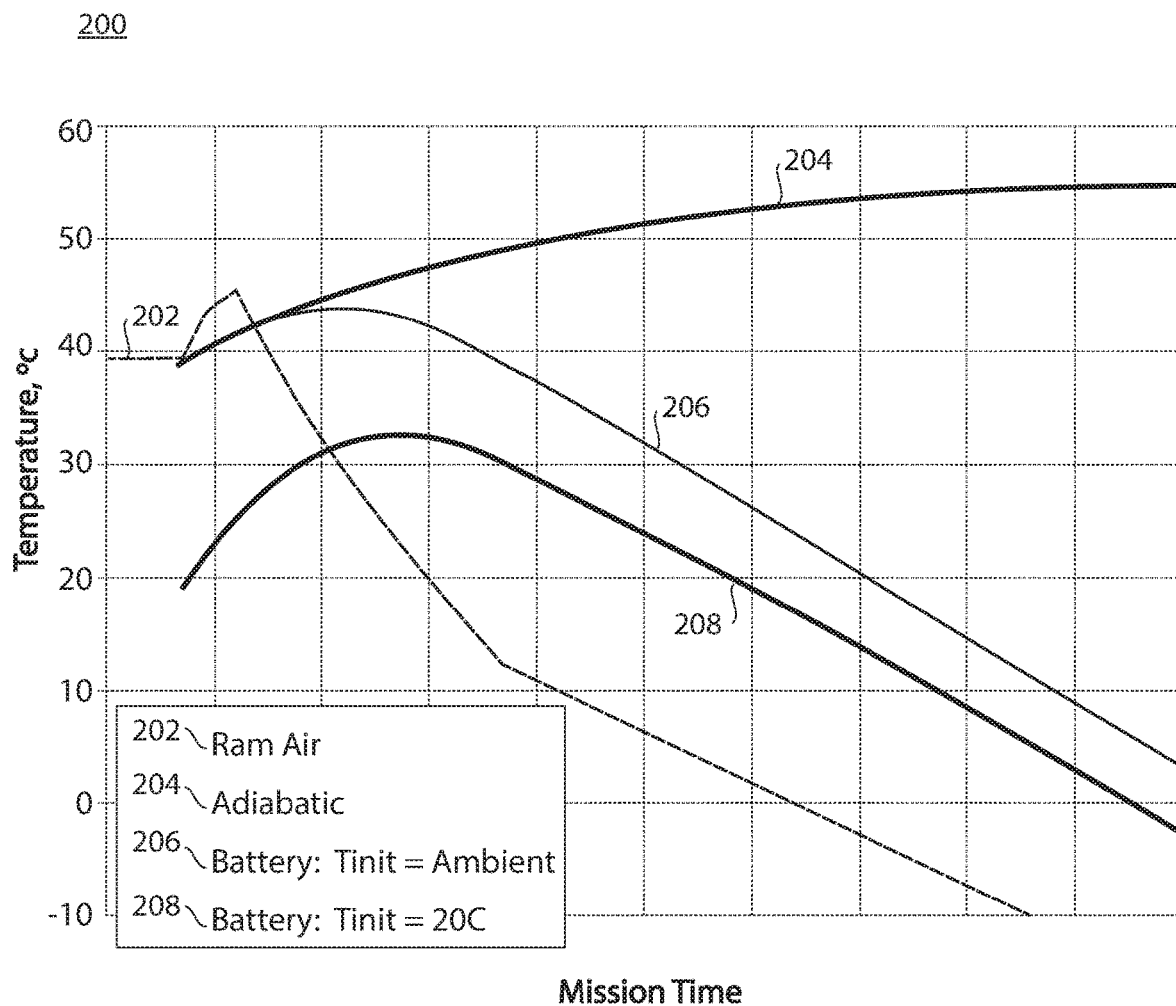
FIG. 2 is a plot representing temperature versus mission time, showing battery temperature across the mission with pre-cooling versus no-precooling.
Figure 3:
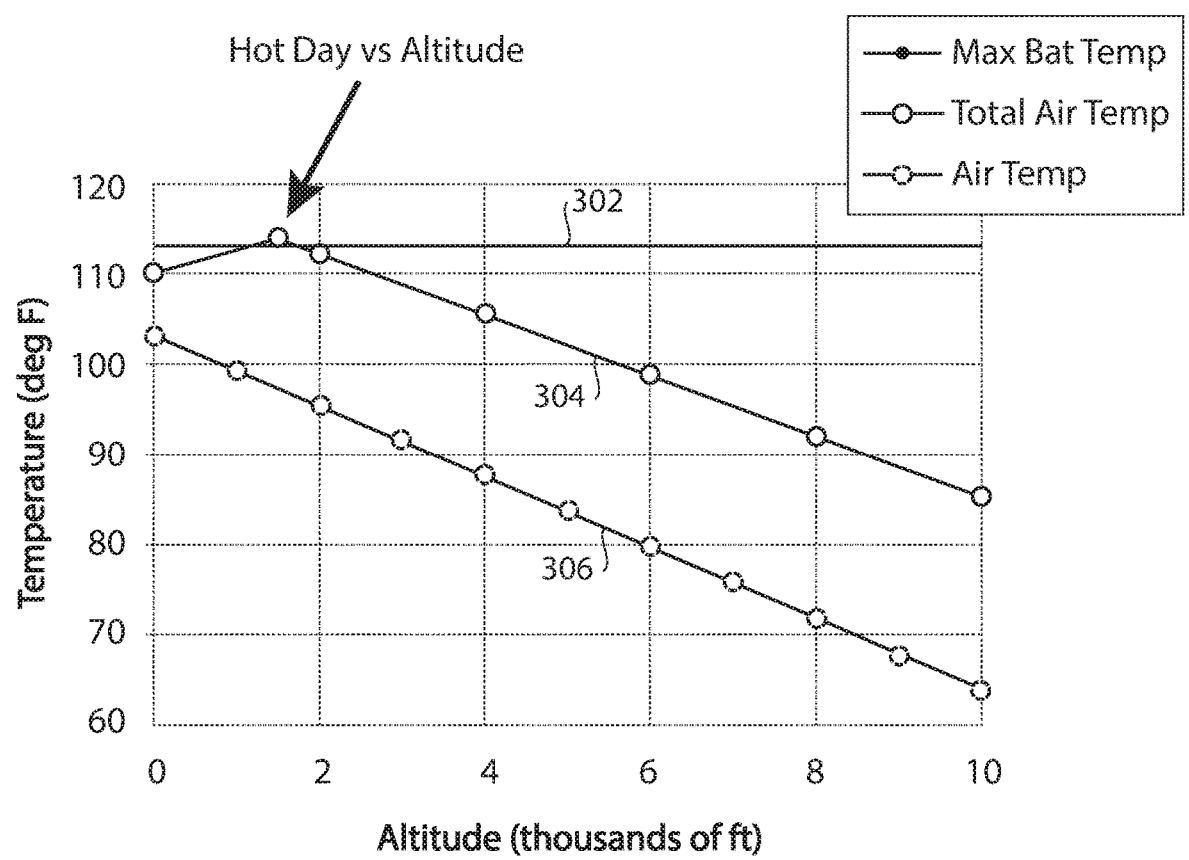
FIG. 3 is a plot representing temperature versus altitude, showing a maximum battery temperature.

As shown in FIG. 3, in some embodiments, system 100 is used on a hot day to provide cooling during charging/discharging or pre-cooling before any charging/discharging. On a hot day, at low altitude and high velocity, the total air temperature of the ram air, represented by line 304 may exceed the desired maximum battery temperature, represented by line 302, e.g. 113° F. or 45° C. As the altitude increases, the total air temperature and the air temperature of the atmospheric air will decrease. Line 306 represents the ambient air temperature. In this case, because $T_{ra}>(T_B+\Delta T)$ at low altitudes, controller 102 will command pump 109 to turn off and instead will allow the temperature in the batteries 104 to rise, also described below with respect to FIG. 2. Once $T_{ra}<(T_B+\Delta T)$, controller 102 (e.g. between an altitude of 5,000-10,000 feet) controller 102 will command ram air door 115 to open (if not already open) and pump 109, motor 111 and circuit 116 "ON" to begin to remove heat from batteries 104 via air heat exchange circuit 114. Those skilled in the art will readily appreciate that the temperatures shown herein may vary depending on battery chemistry, weather, time of day, or the like. The pre-determined threshold for the battery temperature, described above, can be set based on the maximum battery temperature for a given battery chemistry.

A method for controlling a thermal management system, e.g. system 100, for an air vehicle includes determining an expected temperature of batteries, e.g. batteries 104, cooling the batteries with a cooling device, e.g. liquid-air heat exchanger 112 or liquid-liquid heat exchanger 108, if the expected temperature exceeds a pre-determined expected temperature threshold. Determining the expected temperature includes measuring a temperature of the batteries. Cooling the batteries includes cooling the batteries with the liquid-air heat exchanger positioned on a liquid heat exchange circuit, e.g. liquid heat exchange circuit 116, and an air heat exchange circuit, e.g. air heat exchange circuit 114, to exchange heat therebetween.

The method includes measuring a total air temperature of air entering the air scoop with a temperature sensor, e.g. temperature sensor 113, upstream from the air heat exchange circuit. Cooling the batteries includes measuring a total air temperature of air entering an air scoop. If the total air temperature of air entering the air scoop is below a pre-determined total air temperature threshold, cooling the batteries includes opening a ram air door, e.g. ram air door 115, to cool the batteries. This cooling can be pre-cooling and can be used where a scenario like that of FIG. 2 is expected. Line 202 represents a ram air temperature and line 204 represents the battery temperature at an adiabatic state (e.g. if there were not any cooling). By pre-cooling and starting from approximately 20° C. (68° F.), as indicated by line 208, battery overheating can be prevented without having to cool the batteries during the actual charge/discharge.

During ground operations, embodiments of the method include cooling the batteries with a liquid-liquid heat exchanger, e.g. liquid-liquid heat exchanger 108, positioned on a first liquid heat exchange circuit, e.g. liquid heat exchange circuit 116, and a movable second liquid heat exchange circuit, e.g. liquid heat exchange circuit 117, to exchange heat therebetween. Cooling with the movable liquid heat exchange circuit may be desirable where ram air is not available. Additionally, if the batteries themselves have thermal capacity, the method includes charging and/or discharging the batteries without cooling if the expected temperature of the batteries does not exceed the pre-determined expected temperature threshold. If so desired, the batteries can be cooled once a heat sink, e.g. ram air is available. This scenario is described in more detail below with reference to FIG. 2.

In accordance with some embodiments, the ability to reject heat to an on-ground liquid heat exchange circuit, e.g. liquid heat exchange circuit 117, or to ambient ram air via air heat exchange circuit, e.g. air heat exchange circuit 114, may not be available. Accordingly, a method for controlling a thermal management system, e.g. system 100, for an air vehicle includes determining an expected temperature of batteries, e.g. batteries 104, and charging and/or discharging the batteries without pre-cooling or cooling if the expected temperature of the batteries does not exceed a pre-determined temperature threshold. In one embodiment, the stagnation temperature of ram air for an aircraft at low altitude on a hot day (40° C.) during takeoff, climb out, and initial climb, may be higher than the maximum desired battery temperature, so cooling with ram air may not be desired. In this case, the batteries are allowed to heat up optionally with monitoring by a sensor, e.g. sensor 107, in operative communication with a controller, e.g. controller 102. In other words, if the expected temperature of the batteries during charge or discharge is not expected to rise above its maximum temperature, pre-cooling or cooling during discharge may not be required.

As shown in FIGS. 2-3, where the total ram air temperature, indicated schematically by line 304, exceeds a battery temperature, the batteries, e.g. batteries 104, are allowed to heat up by way of charge or discharge and then are cooled once the ram air temperature decreases. In other words, the method can include turning the cooling system, e.g. circuits 116 and 114, to an "OFF" state with the controller. The temperature of the batteries in this scenario is represented schematically by line 204 in FIG. 2. An adiabatic temperature of the batteries (e.g. without any cooling) is also indicated schematically by line 204 to show a potential outcome without the later cooling. After discharge, and/or once the aircraft reaches an altitude where the total air temperature is lower than the battery temperature, the method includes turning the cooling circuit, e.g. liquid heat exchange circuit 116 and air heat exchange circuit 114, "ON" by the controller, during, before, or after charge or discharge, when a heat sink, e.g. cooling ram air, is readily available. For example, at an altitude between 5,000 and 10,000 ft, the ambient air is sufficiently cool even on a hot day, as defined by MIL-STD-210C, to serve a heat sink for rejected heat from the batteries.

At the altitude at which the cooling system is actuated, the batteries may still continue to store some heat as well as reject some to the air heat exchange circuit, e.g. air heat exchange circuit 114. An aircraft may encounter a condition wherein heat rejection from batteries continues during cruise in excess of battery heat loads. As a result, in this embodiment, the method includes cooling the batteries (e.g. to 5° C.) at a higher altitude when the cooling system is actuated (e.g. circuits 116 and 114 are actuated by controller 102). This is desirable because the charging process causes the batteries to heat up, and pre-cooling them helps reduce the cooling load. Moreover, for an aircraft application, the power required for climb steadily diminishes until cruising altitude is reached due in part to the reduced drag in thinner atmosphere. As a result, an aircraft that derives propulsive energy from batteries, e.g. batteries 104, during climb will experience steadily decreasing heat loads. The decreases in battery heat load and in ambient temperature both facilitate battery-cooling.

The methods and systems of the present disclosure, as described above and shown in the drawings, provide for thermal battery control with superior properties including smaller heat exchangers, avoiding overheating and capacity fade, and avoiding thermal runaway. The systems and methods of the present invention can apply to automotive batteries, aircraft batteries, terrestrial batteries, or the like. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A battery thermal management system for an air vehicle comprising:
   a liquid heat exchange circuit;
   at least one battery in thermal communication with the liquid heat exchange circuit;
   a controller operatively connected to the liquid heat exchange circuit by way of a pump operatively connected to the liquid heat exchange circuit, wherein the controller is operatively connected to the pump and configured and adapted to select whether or not the pump of the liquid heat exchange circuit is "ON" or "OFF"; and
   at least one heat exchanger positioned on the liquid heat exchange circuit, wherein the at least one heat exchanger is a liquid-air heat exchanger, wherein the liquid-air heat exchanger is positioned on an air heat exchange circuit configured and adapted to receive air; and
   a temperature sensor operatively connected to the air heat exchange circuit upstream from the liquid-air heat exchanger and downstream from an air source, wherein the temperature sensor is positioned to measure a total air temperature of air entering the air source.

2. The system as recited in claim 1, further comprising a liquid-liquid heat exchanger on the liquid heat exchange circuit, wherein the liquid-liquid heat exchanger is configured and adapted to be operatively connected to a movable second liquid heat exchange circuit.

3. The system as recited in claim 1, wherein the air heat exchange circuit is in fluid communication with an air scoop.

4. The system as recited in claim 3, wherein the air scoop is the air source.

5. The system as recited in claim 1, wherein if an expected battery temperature exceeds a pre-determined threshold, the controller is configured and adapted to command the pump ON to circulate heat transfer fluid through the liquid heat exchange circuit and pre-cool the at least one battery prior to the at least one battery being charged or discharged.

6. The system as recited in claim 3, wherein the air scoop is the air source, wherein the controller is operatively connected to the temperature sensor to receive temperature data therefrom.

7. The system as recited in claim 6, wherein the controller is configured and adapted to at least one of activate or deactivate a coolant pump depending on the temperature data from the temperature sensor.

8. The system as recited in claim 6, wherein the controller is configured and adapted to close a flow restrictor if a total air temperature of air entering the air scoop is greater than a desired battery temperature.

9. The system as recited in claim 1, further comprising a controller operatively connected to the liquid heat exchange circuit, wherein if an expected battery temperature exceeds a pre-determined threshold, the controller is configured and adapted to command the liquid heat exchange circuit "ON" to pre-cool the at least one battery prior to the at least one battery being charged or discharged.

10. The system as recited in claim 1, further comprising a battery temperature sensor positioned to measure a temperature of the at least one battery.

* * * * *